(12) United States Patent
Takahashi et al.

(10) Patent No.: US 9,784,138 B2
(45) Date of Patent: Oct. 10, 2017

(54) WASTE HEAT POWER GENERATION DEVICE

(71) Applicant: IHI Corporation, Tokyo (JP)

(72) Inventors: Toshio Takahashi, Tokyo (JP);
Hirohisa Wakisaka, Tokyo (JP);
Kouichi Machida, Tokyo (JP)

(73) Assignee: IHI CORPORATION, Tokyo (JP)

( * ) Notice: Subject to any disclaimer, the term of this patent is extended or adjusted under 35 U.S.C. 154(b) by 246 days.

(21) Appl. No.: 14/710,276

(22) Filed: May 12, 2015

(65) Prior Publication Data
US 2015/0247427 A1    Sep. 3, 2015

Related U.S. Application Data

(63) Continuation of application No. PCT/JP2013/079988, filed on Nov. 6, 2013.

(30) Foreign Application Priority Data

Nov. 28, 2012   (JP) .................................. 2012-259726

(51) Int. Cl.
| F01K 13/02 | (2006.01) |
|---|---|
| F01K 25/08 | (2006.01) |
| F01K 7/16 | (2006.01) |
| F01K 13/00 | (2006.01) |

(Continued)

(52) U.S. Cl.
CPC ................ *F01K 13/02* (2013.01); *F01K 7/16* (2013.01); *F01K 13/003* (2013.01); *F01K 15/00* (2013.01); *F01K 19/02* (2013.01); *F01K 25/08* (2013.01); *Y02E 20/14* (2013.01)

(58) Field of Classification Search
CPC .... F01K 9/00–9/04; F01K 9/023; F01K 13/02
See application file for complete search history.

(56) References Cited

U.S. PATENT DOCUMENTS

| 2007/0201599 A1* | 8/2007 | Fushimi ................. G21C 1/084 376/216 |
|---|---|---|
| 2011/0048043 A1 | 3/2011 | Takahashi et al. |

FOREIGN PATENT DOCUMENTS

| JP | 59-049303 A | 3/1984 |
|---|---|---|
| JP | 08-082203 A | 3/1996 |
| JP | 09-032508 A | 2/1997 |

(Continued)

OTHER PUBLICATIONS

Machine translation of JP2008312330A, accessed on Mar. 9, 2017.*

(Continued)

*Primary Examiner* — Jonathan Matthias
(74) *Attorney, Agent, or Firm* — Volpe and Koenig, P.C.

(57) ABSTRACT

A waste heat power generation device having: an evaporator that recovers waste heat energy to evaporate a working medium; an expansion turbine generator that generates electric power with the working medium being supplied from the evaporator; a condenser that condenses the working medium discharged from the expansion turbine generator; a pump that feeds the working medium condensed in the condenser toward the evaporator; a measuring device that measures the amount of power generated by the expansion turbine generator per unit time; and a control device that controls the driving of the pump based on the measurement result of the measuring device.

8 Claims, 2 Drawing Sheets

(51) Int. Cl.
F01K 15/00 (2006.01)
F01K 19/02 (2006.01)

(56) References Cited

FOREIGN PATENT DOCUMENTS

| | | |
|---|---|---|
| JP | 11-036818 A | 2/1999 |
| JP | 2008-309046 A | 12/2008 |
| JP | 2008-312330 A | 12/2008 |
| JP | 2009-221961 A | 10/2009 |
| JP | 2011-214430 A | 10/2011 |

OTHER PUBLICATIONS

Machine translation of JP2011214430A, accessed on Mar. 9, 2017.*
Machine translation of JPH0932508A, accessed on Mar. 9, 2017.*
International Search Report, PCT/JP2013/079988, Dec. 10, 2013, 4 pgs total (2 pgs Japanese language; 2 pgs English language).
Taiwanese Office Action with English translation, Taiwanese Patent Application No. 102142221, dated Feb. 24, 2015, 7 pgs.

* cited by examiner

WASTE HEAT POWER GENERATION DEVICE

This application is a Continuation of International Application No. PCT/JP2013/079988, filed on Nov. 6, 2013, claiming priority based on Japanese Patent Application No. 2012-259726, filed Nov. 28, 2012, the contents of both International Application and the Japanese Application are incorporated herein by reference in their entirety.

TECHNICAL FIELD

The present invention relates to a waste heat power generation device, and in particular to a waste heat power generation device that performs organic Rankine cycle power generation.

BACKGROUND ART

Power generation has conventionally been performed by recovering waste heat energy released at plants, incineration facilities and the like, with energy savings being achieved by the electrical energy that is obtained by this power generation being reused. In recent years, measures have been taken to realize further energy savings by performing power generation by also recovering the waste heat energy of low-temperature waste heat that has hardly been recovered conventionally. In order to recover electrical energy from this kind of low-temperature waste heat, a Rankine cycle waste heat power generation device that uses a low-boiling-point working medium has been proposed (for example, Patent Document 1).

Patent Document 1 discloses an exhaust heat power generation device that is provided with a steam generator, introduces an exhaust heat medium from an exhaust heat source to the steam generator, guides the generated working medium steam to an expansion machine, generates electricity by driving a generator with this expansion machine, leads discharged working medium steam to a condenser, cools/condenses the working medium steam by a low-heat medium from a low-heat source, and supplies this condensed working medium liquid to the steam generator. In this exhaust heat power generation device, a working medium steam superheat degree control member is provided that controls to a predetermined target value the superheat degree of the working medium steam at the steam discharge port or corresponding portion of this steam generator by varying the flow rate of the working medium liquid supplied to the steam generator.

PRIOR ART DOCUMENTS

Patent Document

[Patent Document 1] Japanese Unexamined Patent Application, First Publication No. 2008-309046

DISCLOSURE OF THE INVENTION

Problems to be Solved by the Invention

However, there is the following possibility in the aforementioned prior art.

The internal cycle of a waste heat power generation device is normally controlled so that it performs the most power generation from waste heat, and in the aforementioned prior art, the superheat degree of the working medium steam derived from the measuring result of a pressure sensor and temperature sensor is controlled to a predetermined target value. However, the waste heat energy readily fluctuates due to the circumstances at the supply side (plant or incineration facility), while the pressure sensor and temperature sensor are not sensitive to this fluctuation of waste heat energy. Accordingly, in the case of for example the supply of a waste heat medium to an evaporator suddenly stopping, since the feeding of the working medium to the evaporator via a pump is continued, the working medium is supplied in a liquid form from the evaporator to the turbine generator, causing the occurrence of erosion of the impeller of the turbine generator.

The present invention is achieved in view of the above circumstances, and has as its object to provide a waste heat power generation device that can operate in a manner suitably responding to sudden fluctuations of waste heat energy.

Means for Solving the Problems

The first aspect of the present invention is a waste heat power generation device having an evaporator that recovers waste heat energy and evaporates a working medium; a turbine generator that generates electric power with the working medium being supplied from the evaporator; a condenser that condenses the working medium discharged from the turbine generator; a pump that feeds the working medium condensed in the condenser toward the evaporator; a measuring portion that measures the amount of power generated by the turbine generator per unit time; and a control portion that controls the driving of the pump based on the measurement result of the measuring portion.

In the first aspect of the present invention, since it is possible to reflect fluctuations of waste heat energy in control of the pump comparatively quicker than the temperature or pressure of the working medium by performing control based on the amount of power generation of the turbine generator per unit time, it is possible to suitably respond to sudden fluctuations in the waste heat energy.

In the second aspect of the present invention, the control portion controls the driving of the pump based on the slope of the change in the amount of power generated.

In the third aspect of the present invention, the control portion stops the driving of the pump in the case of the slope of the change in the amount of power generated being equal to or less than a negative slope set in advance.

In the fourth aspect of the present invention, the control portion reduces the amount of the working medium fed by the pump per unit time by a first slope in the case of the amount of power generation being equal to or greater than a first threshold value.

In the fifth aspect of the present invention, the control portion reduces the amount of the working medium fed by the pump per unit time by a second slope that is larger on the negative side than the first slope in the case of the amount of power generation being equal to or greater than a second threshold value that is larger than the first threshold value.

In the sixth aspect of the present invention, the control portion stops the driving of the pump in the case of the amount of power generation being equal to or greater than a third threshold value that is larger than the second threshold value.

Effects of the Invention

According to the present invention, a waste heat power generation device is obtained that can operate in a manner suitably responding to sudden fluctuations of waste heat energy.

EMBODIMENTS FOR CARRYING OUT THE INVENTION

Hereinbelow, an embodiment of the present invention shall be described with reference to the drawings.

Figure 1:
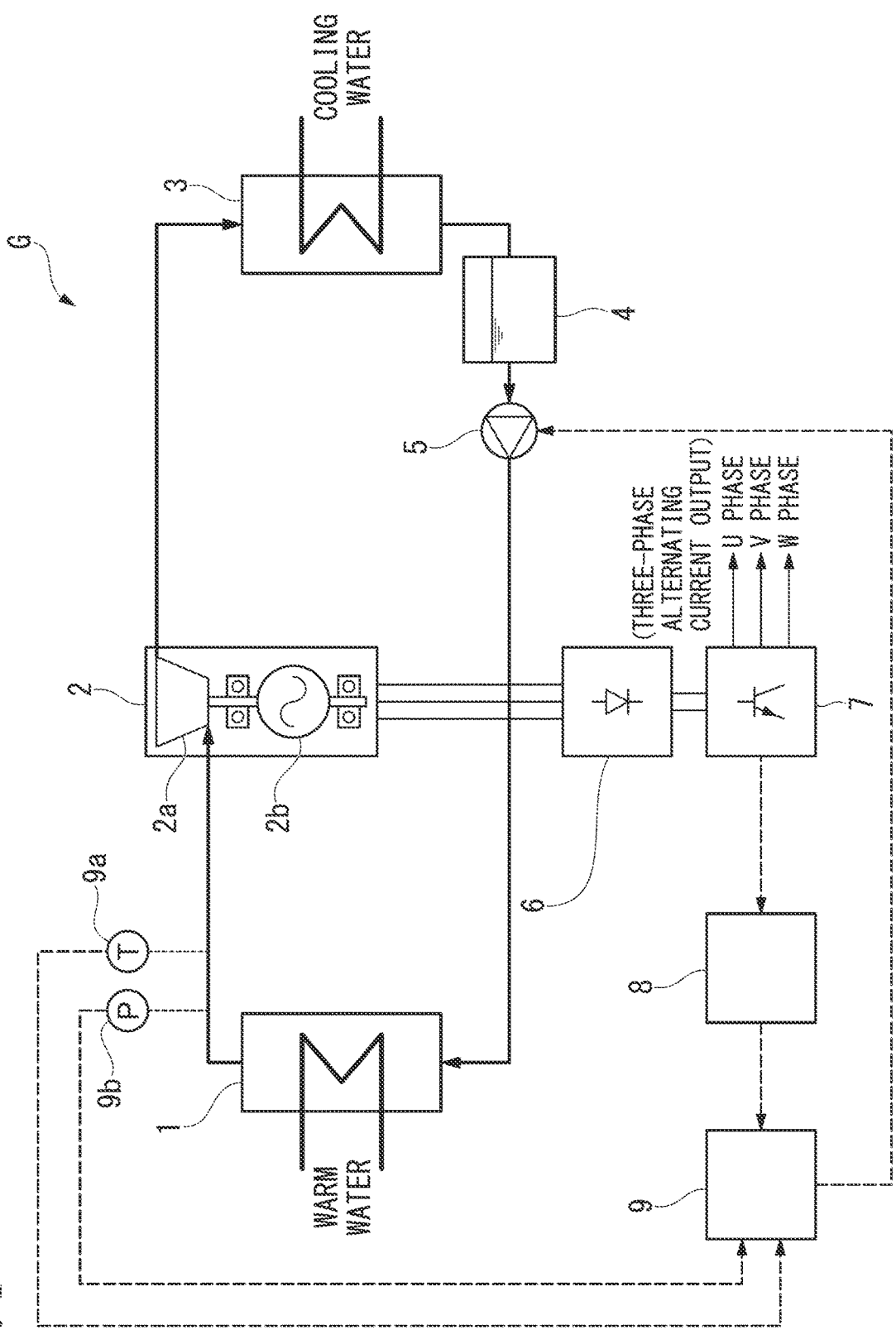
FIG. 1 is a block diagram of the waste heat power generation device in an embodiment of the present invention.

FIG. 1 is a block diagram of a waste heat power generation device G in the embodiment of the present invention.

As shown in FIG. 1, the waste heat power generation device G of the present embodiment is a power generation device using the Rankine cycle that is provided with an evaporator 1, an expansion turbine generator 2 (turbine generator), a condenser 3, a reservoir tank 4 (storage device), and a pump 5. The waste heat power generation device G generates electric power using waste heat energy of low-temperature waste heat (in the present embodiment, warm water, hereinbelow at times referred to as a heat source) that is released from plants, incineration facilities and the like.

Also, the waste heat power generation device G is provided with an AC-DC converter 6 and a DC-AC converter 7, and outputs waste heat energy as electrical energy (three-phase alternating current power). This waste heat power generating device G is provided, for example, in a facility such as a plant, and generates three-phase alternating current power of the same specification as commercial power.

This three-phase alternating current power is supplied to each portion of a facility and consumed. That is, this waste heat power generation device G is installed in a facility in order to improve the overall energy efficiency of the facility.

The evaporator 1 recovers low-temperature waste heat emitted from a plant and the like to generate steam of a working medium. The evaporator 1 is a kind of heat exchanger that vaporizes the working medium by heat exchange with a heat source. In this evaporator 1, a flow passage through which a heat source (for example, warm water) circulates and a flow passage in which the working medium circulates are provided so as to be adjacent, whereby the heat of the heat source that is on the high-temperature side is efficiently conducted to the working medium which is on the low-temperature side. This kind of evaporator 1 vaporizes the liquid-state working medium that is supplied from the pump 5 and supplies the gas-state working medium to the expansion turbine generator 2.

As the working medium of the present embodiment, it is preferable to use for example a medium with a boiling point (boiling point under atmospheric condition) of 35° C., and whose pressure in the device during operation is a maximum of 1 MPa (G) (1 MPa by gauge pressure) or less. The reason for that is to enable the generation of steam from low-temperature waste heat for enabling power generation utilizing waste heat energy of low-temperature waste heat of for example approximately 100° C. or less, and to hold down the internal pressure of the expansion turbine generator 2 by keeping the pressure of the entire device at a low level.

When the internal pressure of the expansion turbine generator 2 is kept low, since a high pressure does not act on the casing of the expansion turbine generator 2, the evaporator 1 and the condenser 3, synergistic effects of safety and low-cost manufacture being possible are also obtained. Here, as the aforementioned working medium, it is possible to use hydrofluoro ether (HFE), fluorocarbon, fluorinated ketone, perfluoro polyether, and the like.

The expansion turbine generator 2 generates three-phase alternating current power using the gas-state working medium supplied from the evaporator 1. This expansion turbine generator 2 is provided with a turbine 2a and a generator 2b as shown in FIG. 1. The turbine 2a is a rotary machine driven by the working medium supplied from the evaporator 1. That is, this turbine 2a is equipped with a receiving port that receives the working medium from the evaporator 1, an exhaust port that discharges the working medium to the condenser 3, and a turbine impeller in which a shaft (turbine shaft) is coupled with the generator 2b, and thus causes the turbine impeller to rotate with the working medium being supplied from the evaporator 1.

The generator 2b is a rotating machine that generates three-phase alternating current power by being driven by the rotative power of the turbine 2a. That is to say, this generator 2b is constituted by an approximately cylindrical rotor (field magnet) that is axially coupled with the turbine shaft of the turbine 2a, and a stator (armature winding) that is provided in an annular shape at the outer circumference of this rotor. In this kind of generator 2b, the rotor (field magnet) is rotationally driven by the turbine 2a, whereby electromotive force is generated in the stator (armature winding). Note that the frequency and/or output voltage of the three-phase alternating current power that this generator 2b outputs differs from that of the specification of commercial power (grid-connected power). Here, the approximately cylindrical rotor means a substantially cylindrical rotor. That is to say, an approximately cylindrical rotor is not only a cylindrical rotor, and also includes a rotor that, while not an exact cylindrical shape, functions in the same way as a cylindrical rotor.

A condenser 3 cools with a cooling medium such as cooling water the steam after it passes through the expansion turbine generator 2 to condense it. The condenser 3 is a kind of heat exchanger that condenses (liquefies) the working medium by heat exchange with the cooling water. This kind of condenser 3 supplies the liquid working medium to the reservoir tank 4. The reservoir tank 4 is a tank in which the working medium that is condensed in the condenser 3 is stored temporarily. The pump 5 pressurizes the working medium that is condensed by the condenser 3 and temporarily stored in the reservoir tank 4, to feed it toward the evaporator 1. In addition, this pump 5 is rotatively driven by for example an electric motor.

The AC-DC converter 6 and the DC-AC converter 7 convert the three-phase alternating current power generated by the generator 2b to three-phase alternating current power conforming to the specification of commercial power (grid-connected power) (for example, 50/60 Hz, 200 V). Among the AC-DC converter 6 and the DC-AC converter 7, the front-stage AC-DC converter 6 converts the three-phase alternating current power received from the generator 2b to direct current power and outputs it to the DC-AC converter 7. The rear-stage DC AC converter 7 converts the aforementioned direct current power to three-phase alternating current power conforming to the specification of commercial power (grid-connected power).

The waste heat power generation device G of the present embodiment is provided with a measuring device (measuring portion) 8 that measures the amount of power generation per unit time (for example, per second) of the expansion turbine generator 2 (hereinbelow sometimes simply called the power generation amount) via the AC-DC converter 6 and the DC-AC converter 7, that is, the power regenerative converter, and a control device (control portion) 9 that controls the driving of the pump 5 based on the measurement result of the measuring device 8. The measuring device 8 is connected to the DC-AC converter 7 (or to the AC-DC converter 6), and outputs the measurement result to the control device 9. The measuring device 8 has a noise filter so as not to pick up noise of the power generation amount (for example microsecond-order noise).

The control device 9 confirms the amount of power generation (absolute amount) confirmed by the control of the power regenerative converter, and controls the driving of the pump 5 in accordance with threshold values set in advance (specifically, a first threshold value T1, a second threshold value T2, and a third threshold value T3 described below, refer to FIG. 2).

Also, the control device 9 confirms the slope of the change in the amount of power generation, and in the case of having become a slope equal to or greater than a condition set in advance (specifically, in the case of being a negative slope S or less set in advance as described below), rapidly stops driving of the pump 5.

Note that the control device 9 of the present embodiment ordinarily controls the internal cycle so as to perform the most power generation in the conventional waste heat state based on the measurement result of a temperature sensor 9a and a pressure sensor 9b.

Figure 2:
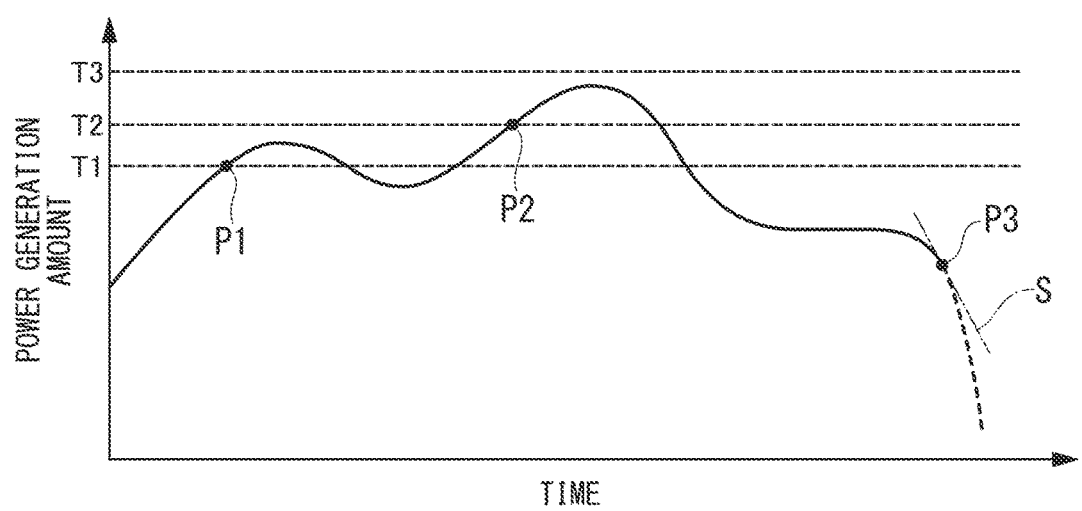
FIG. 2 is a graph for describing control of a pump based on changes in the amount of power generation in the embodiment of the present invention.

Next, the operation of the waste heat power generation device G constituted in this way shall be described referring to FIG. 2.

FIG. 2 is a graph for describing control of the pump 5 based on changes in the amount of power generation in the embodiment of the present invention. Note that in FIG. 2, the vertical axis denotes the amount of power generation, while the horizontal axis denotes time.

Initially, when describing the power generation operation (main operation) of the waste heat power generation device G, power generation is performed in the expansion turbine generator 2 by the working medium changing to a liquid and gas while the working medium circulates in the waste heat power generation device G of the present embodiment in the sequence of evaporator 1→expansion turbine generator 2→condenser 3→reservoir tank 4→pump 5→evaporator 1.

That is to say, the working medium that is evaporated in the evaporator 1 by the heat of the heat source, after being supplied to the expansion turbine generator 2, is condensed by the cooling water in the condenser 3, and after being temporarily stored in the reservoir tank 4, is fed again to the evaporator 1 via the pump 5. In the process of the cyclical phase changes of the working medium, power generation is performed by the expansion turbine generator 2 by the action of the working medium.

The three-phase alternating current power that is produced in the expansion turbine generator 2 is converted to three-phase alternating current power conforming to the specification of commercial power (grid-connected power) by passing through the AC-DC converter 6 and the DC-AC converter 7 and then supplied to the outside.

As shown in FIG. 2, the control device 9 ordinarily computes the superheat degree based on the measurement result of the temperature sensor 9a and the pressure sensor 9b, and by controlling the driving of the pump 5 so that this superheat degree becomes a predetermined target value, controls the internal cycle so as to perform the most power generation in the conventional waste heat state. Also, during emergencies the control device 9 performs the following control based on the amount of power generation per unit time of the expansion turbine generator 2. That is, in the present embodiment, control based on the amount of power generation is set to a higher priority than control based on the superheat degree.

In the case of the amount of power generation being equal to or greater than a first threshold value T1 (indicated by the reference numeral P1), the control device 9 reduces the amount of the working medium fed by the pump 5 per unit time by a first slope. Specifically, when the amount of power generation becomes the first threshold value T1, the control device 9 puts the pump 5 in a deceleration state of negative acceleration so as to gradually reduce rotation speed of the pump 5. With this control, the amount of evaporation of the working medium in the evaporator 1 is suppressed, and as a result the amount of power generation in the expansion turbine generator 2 can be reduced. Note that once the amount of power generation becomes less than the threshold value T1, the control device 9 switches the mode to the ordinary superheat degree control.

Also, in the case of the amount of power generation equal to or greater than a second threshold value T2 that is larger than the first threshold value T1 (indicated by the reference numeral P2), the control device 9 reduces the amount of the working medium fed by the pump 5 per unit time by a second slope that is greater on the negative side than the first slope. Specifically, when the amount of power generation becomes the subsequent second threshold value T2, the control device 9 puts the pump 5 in a deceleration state of negative acceleration so as to more rapidly reduce rotation speed of the pump 5. Note that once the amount of power generation becomes less than the threshold value T1. the control device 9 switches the mode to the ordinary superheat degree control.

Also, in the case of the amount of power generation being equal to or greater than a third threshold value T3 that is even larger than the second threshold value T2, the control device 9 stops the driving of the pump 5. That is, in the case of exceeding the third threshold value T3 that is the ultimate limit threshold value, the control device 9 immediately stops the pump 5. By doing so in this way, even when waste heat energy is supplied to an excessive degree, it is possible to prevent the expansion turbine generator 2 from being driven beyond its limit. Also, due to the control device 9 performing deceleration control on the driving of the pump 5 with the first threshold value T1 and the second threshold value T2 being provided on the near side of the third threshold value T3, since it is possible to inhibit power generation that exceeds the performance of the expansion turbine generator 2 when there is an abundance of waste heat leading to the generation of excessive power, the control device 9 maintains a state in which the device can safely generate power.

Therefore, in the case of the amount of power generation having exceeded the first threshold value T1, by performing control so as to gradually reduce driving of the pump 5, it is possible to inhibit power generation exceeding the performance of the turbine generator 2. Therefore, in the case of the amount of power generation having exceeded the second threshold value T2, by performing control so as to more quickly lower the driving of the pump 5, it is possible to reliably inhibit power generation exceeding the performance of the turbine generator 2.

Therefore, in the case of the amount of power generation having exceeded the third threshold value T3, by performing control so as to stop the driving of the pump 5, it is possible to more reliably inhibit power generation exceeding the performance of the turbine generator 2.

In addition, the control device 9 stops the driving of the pump 5 in the case of the slope of the change in the amount of power generation being equal to or less than a negative slope S set in advance (shown by the reference numeral P3), even when less than the predetermined threshold values T1, T2, and T3. That is, the amount of power generation by the expansion turbine generator 2 per unit time is comparatively more sensitive to fluctuations in waste heat energy than to the temperature and pressure of the working medium, and so it is possible to promptly observe sudden fluctuations of the waste heat energy from the slope of the change in amount of power generation. For this reason, in the case of the slope of the change in the amount of power generation having fallen below the setting, the control device 9 judges power generation to be in a difficult state (the supply of warm water has suddenly stopped or the like), and immediately stops the driving of the pump 5. Thereby, it is possible to prevent the occurrence of erosion of the turbine impeller due to for example the pump 5 continuing to feed the working medium to the evaporator 1, and the liquid-state working medium being supplied to the expansion turbine generator 2.

Therefore, since it is possible to quickly observe sudden fluctuations in waste heat energy from the slope of the change in the amount of power generated, it is possible to suitably respond to sudden fluctuations in the waste heat energy.

Therefore, in the case of the slope of the change in the amount of power generated falling below the setting, since it is possible to judge power generation to be in a difficult state, driving of the pump 5 is stopped.

Note that since the amount of power generation is comparatively more sensitive to fluctuations in waste heat energy than to the temperature and pressure of the working medium, while it may be made to correspond to the supply stoppage state of warm water by setting a lower limit of the amount of power generation and performing the aforedescribed threshold control, a time lag of for example over 10 seconds occurs until the amount of power generation decreases to this lower limit threshold value (note that in the case of temperature and pressure, the time lag is more than several tens of seconds). Regarding this point, if the driving of the pump 5 is controlled based on the slope of the change in the amount of power generation as stated above, since it is possible to comparatively quickly reflect fluctuations of waste heat energy in control of the pump 5, it is possible to suitably respond to sudden fluctuations in the waste heat energy. For example, even in the state of the supply of warm water serving as the heat source having suddenly stopped due to conditions on the supply side as described above, it is possible to rapidly stop the driving of the pump 5 in appropriate response to sudden fluctuations of the waste heat energy and ensure that the liquid-state working medium is not supplied to the expansion turbine generator 2.

In this way, the waste heat power generation device of the aforementioned embodiment has the evaporator 1 that recovers waste heat energy to evaporate a working medium, the expansion turbine generator 2 that generates electric power with the working medium being supplied from the evaporator 1, the condenser 3 that condenses the working medium discharged from the expansion turbine generator 2, the pump 5 that feeds the working medium condensed in the condenser 3 toward the evaporator 1, the measuring device 8 that measures the power generation amount per unit time of the expansion turbine generator 2, and the control device 9 that controls the driving of the pump 5 based on the measurement result of the measuring device 8. Since this waste heat power generation device G can comparatively more quickly reflect fluctuations of waste heat energy than the temperature and pressure of the working medium in control of the pump 5, the waste heat power generation device G can operate in a manner suitably responding to sudden fluctuations of the waste heat energy.

Hereinabove, a preferred embodiment of the present invention is described with reference to the drawings, but the present invention is not limited to the aforementioned embodiment. The various shapes and combinations of each composite member shown in the embodiment described above are illustrative only, and various modifications are possible based on design requirements and so forth within a scope that does not deviate from the subject matter of the present invention.

For example, in the embodiment described above, the description was given of stopping the driving of the pump 5 in the case of the slope of the change in the amount of power generation being equal to or less than a negative slope set in advance, but the present invention is not limited to this constitution. For example, the driving of the pump 5 may also be stopped in the case of the slope of the change in the amount of power generation being equal to or greater than a positive slope set in advance (for the case of a high-temperature heat source being suddenly supplied or the like).

Also, for example, in the embodiment described above, the description was given of controlling the amount of power generation based on threshold values set in advance, but the present invention is not limited to this constitution. For example, in the case of there being a need to perform demand control, by changing the threshold values, it is possible to keep the target power generation nearly constant.

In addition, for example in the embodiment described above, waste heat energy from warm water was generated as electrical energy, but the present invention is not limited thereto. For example, waste gas may also be used as the heat source. In addition, the heat source is not limited to waste heat such as waste gas and waste warm water.

Also, for example, in the embodiment described above, the present invention can be applied to the case of using a radial turbine generator such as a centrifugal expansion turbine generator or a diagonal flow expansion turbine generator as the power generation device.

INDUSTRIAL APPLICABILITY

According to the present invention, a waste heat power generation device that can operate suitably in response to sudden fluctuations in waste heat energy is obtained.

The invention claimed is:
1. A waste heat power generation device comprising:
an evaporator configured to recover waste heat energy to evaporate a working medium;
a turbine generator configured to generate electric power with the working medium being supplied from the evaporator;
an AC-DC converter and a DC-AC converter configured to convert a three-phase alternating current power generated by the turbine generator to a three-phase alternating current power conforming to a specification of commercial power;

a condenser configured to condense the working medium discharged from the turbine generator;

a pump configured to feed the working medium condensed in the condenser toward the evaporator;

a measuring device configured to measure the amount of power generated by the turbine generator per unit time; and a controller configured to be connected to the measuring device and to control the driving of the pump based on the measurement result of the measuring device, wherein the measuring device is configured to be connected to the AC-DC converter or the DC-AC converter, and output the measurement result to the controller, and the controller is configured to control the driving of the pump based on the slope of the change in the amount of power generated.

2. The waste heat power generation device according to claim 1, wherein the controller is configured to stop the driving of the pump in the case of the slope of the change in the amount of power generated being equal to or less than a negative slope set in advance.

3. The waste heat power generation device according to claim 2, wherein the controller is configured to reduce the amount of the working medium fed by the pump per unit time by a first slope in the case of the amount of power generation being equal to or greater than a first threshold value.

4. The waste heat power generation device according to claim 3, wherein the controller is configured to reduce the amount of the working medium fed by the pump per unit time by a second slope that is larger on the negative side than the first slope in the case of the amount of power generation being equal to or greater than a second threshold value that is larger than the first threshold value.

5. The waste heat power generation device according to claim 4, wherein the controller is configured to stop the driving of the pump in the case of the amount of power generation being equal to or greater than a third threshold value that is larger than the second threshold value.

6. The waste heat power generation device according to claim 1, wherein the controller is configured to reduce the amount of the working medium fed by the pump per unit time by a first slope in the case of the amount of power generation being equal to or greater than a first threshold value.

7. A waste heat power generation device comprising:

an evaporator configured to recover waste heat energy to evaporate a working medium;

a turbine generator configured to generate electric power with the working medium being supplied from the evaporator;

an AC-DC converter and a DC-AC converter configured to convert a three-phase alternating current power generated by the turbine generator to a three-phase alternating current power conforming to a specification of commercial power;

a condenser configured to condense the working medium discharged from the turbine generator;

a pump configured to feed the working medium condensed in the condenser toward the evaporator;

a measuring device configured to measure the amount of power generated by the turbine generator per unit time; and a controller configured to be connected to the measuring device and to control the driving of the pump based on the measurement result of the measuring device, wherein the measuring device is configured to be connected to the AC-DC converter or the DC-AC converter, and output the measurement result to the controller, the controller is configured to reduce the amount of the working medium fed by the pump per unit time by a first slope in the case of the amount of power generation being equal to or greater than a first threshold value, and the controller is configured to reduce the amount of the working medium fed by the pump per unit time by a second slope that is larger on the negative side than the first slope in the case of the amount of power generation being equal to or greater than a second threshold value that is larger than the first threshold value.

8. The waste heat power generation device according to claim 7, wherein the controller is configured to stop the driving of the pump in the case of the amount of power generation being equal to or greater than a third threshold value that is larger than the second threshold value.

* * * * *